United States Patent
Rue et al.

(10) Patent No.: US 10,173,915 B2
(45) Date of Patent: Jan. 8, 2019

(54) CONVECTIVE THERMAL REMOVAL OF GASEOUS INCLUSIONS FROM VISCOUS LIQUIDS

(75) Inventors: David M. Rue, Chicago, IL (US); V. Walter Kunc, Clarendon Hills, IL (US); John Charles Wagner, Lagrange, IL (US); Chun W. Choi, Chicago, IL (US)

(73) Assignee: GAS TECHNOLOGY INSTITUTE, Des Plaines, IL (US)

( * ) Notice: Subject to any disclaimer, the term of this patent is extended or adjusted under 35 U.S.C. 154(b) by 1070 days.

(21) Appl. No.: 13/030,173

(22) Filed: Feb. 18, 2011

(65) Prior Publication Data
US 2012/0210751 A1 Aug. 23, 2012

(51) Int. Cl.
C03B 5/225 (2006.01)
C03B 5/235 (2006.01)
B01D 19/00 (2006.01)

(52) U.S. Cl.
CPC .......... C03B 5/225 (2013.01); B01D 19/0042 (2013.01); B01D 19/0073 (2013.01); C03B 5/2356 (2013.01)

(58) Field of Classification Search
CPC .............................. C03B 5/235; C03B 5/2356
USPC ................... 65/134.1, 134.9, 135.7
See application file for complete search history.

(56) References Cited

U.S. PATENT DOCUMENTS

| | | | | |
|---|---|---|---|---|
| 452,462 A | * | 5/1891 | Weyer | C03B 5/235 432/161 |
| 3,607,179 A | * | 9/1971 | Loukes | C03B 5/163 65/134.1 |
| 3,764,287 A | * | 10/1973 | Brocious | C03B 5/04 65/135.8 |
| 3,843,346 A | * | 10/1974 | Edge et al. | 65/99.5 |
| 4,816,056 A | * | 3/1989 | Tsai et al. | 65/134.4 |
| 5,116,399 A | * | 5/1992 | Lauwers | C03B 5/04 65/135.1 |
| 6,460,376 B1 | | 10/2002 | Jeanvoine et al. | |
| 6,698,244 B1 | | 3/2004 | Romer et al. | |
| 7,454,925 B2 | | 11/2008 | DeAngelis et al. | |
| 7,584,632 B2 | | 9/2009 | House et al. | |
| 7,874,179 B2 | | 1/2011 | Rue et al. | |
| 2006/0000239 A1 | * | 1/2006 | Jeanvoine et al. | 65/134.7 |
| 2006/0144089 A1 | * | 7/2006 | Eichholz | C03B 5/027 65/29.21 |
| 2010/0126225 A1 | * | 5/2010 | Ding | B01F 7/18 65/135.3 |
| 2011/0236846 A1 | * | 9/2011 | Rue | F27B 3/205 432/195 |

* cited by examiner

*Primary Examiner* — Cynthia Szewczyk
(74) *Attorney, Agent, or Firm* — Pauley Erickson & Kottis

(57) ABSTRACT

A method for removing gaseous inclusions from a viscous liquid in which a viscous liquid stream having gaseous inclusions is introduced into a refining chamber, resulting in a flowing viscous liquid layer. The viscosity of a bottom portion of the viscous liquid layer is reduced in a first refining zone in the refining chamber so as to produce an upwardly mobile reduced viscosity portion of the viscous liquid layer. Heat is introduced into the viscous liquid layer from above the viscous liquid layer in a second refining zone in the refining chamber downstream of the first refining zone, reducing the gaseous inclusions in said viscous liquid layer. Thereafter, the viscous liquid layer having substantially reduced gaseous inclusions is discharged from the refining chamber.

12 Claims, 4 Drawing Sheets

CONVECTIVE THERMAL REMOVAL OF GASEOUS INCLUSIONS FROM VISCOUS LIQUIDS

The U.S. Government has a paid-up license in this invention and the right in limited circumstances to require the patent owner to license others on reasonable terms as provided for by the terms of Contract No. DE-FG36-06GO16010 awarded by the U.S. Department of Energy.

BACKGROUND OF THE INVENTION

Field of the Invention

This invention relates to a method for removing gaseous inclusions from viscous liquids. More particularly, this invention relates to a method for removing gaseous inclusions from high viscosity molten materials, such as molten glass.

Description of Related Art

There are a variety of commercially important materials which exist as viscous liquids during processing and contain a substantial number of gaseous inclusions. Exemplary of such viscous liquids is molten glass. New methods for melting materials such as glass have been proposed in the form of compact, high-intensity melters which employ, for example, submerged combustion melting, plasma melting, electric melting, or other means. These new melters offer significant operations and cost benefits in industrial practice, but they may produce a molten material having large quantities of gaseous inclusions. As a result, the advantages of such high intensity melters are mitigated if removal of the gaseous inclusions is slow or requires large, costly equipment.

Quality specifications for solid products produced from molten materials vary depending on the type of solid product but generally require the removal of gaseous inclusions over a certain diameter and may require removal of gaseous inclusions down to a specified number of inclusions per unit volume of the solid product. Because the inclusions cannot be reduced from a solid product, such inclusions must be removed while the precursor material is in the form of a viscous liquid.

For gaseous inclusions disposed in a viscous liquid, the natural tendency is for the gaseous inclusions to rise to the surface of the viscous liquid. However, the rate at which the gaseous inclusions rise to the surface of the viscous liquid is a function of the viscosity of the liquid and the size of the gaseous inclusions. That is, the rate at which the inclusions rise to the surface decreases with increases in liquid viscosity and decreases in gaseous inclusion diameters. Depending upon the liquid viscosity, conventional means for increasing the rate at which the gaseous inclusions rise to the surface frequently require large, costly furnaces which provide sufficient residence time to allow removal thereof by buoyancy alone. Thus, a method which provides for rapid removal of gaseous inclusions from viscous liquids, particularly from viscous liquids such as molten glass, is highly desirable.

Under normal gravity conditions, a gaseous inclusion, or bubble, will rise to the upper surface of a liquid. This is a consequence of the lower density of the insoluble gas. Increasingly precise mathematical descriptions have been developed which describe this well-known phenomenon in various liquids over a wide range of liquid viscosities, but a general description known as Stokes Law provides a reasonable understanding of the process. Stokes Law states that the velocity at which a bubble rises is proportional to the square of the bubble diameter, proportional to the acceleration of gravity, proportional to the difference in density between the liquid and the gas, and inversely proportional to the viscosity of the liquid. Most methods for speeding the removal of bubbles from liquids, particularly viscous liquids, take advantage of Stokes Law. Proposed and implemented methods for bubble removal have included putting the liquid under vacuum, or reduced pressure, so as to increase bubble diameter and increase bubble velocity; spinning a liquid to increase the effective gravitational constant, g, and, thus, increase bubble velocity; heating a viscous liquid with localized heating by various means, such as electrodes, burners, microwave, and the like, to decrease viscosity which leads to higher bubble velocity; injecting additional bubbles by using bubblers, adding a "fining agent", or injecting a light gas such as helium, so as to effect bubble coalescence, which effectively increases bubble diameter and bubble velocity; passing the liquid over a substantially planar surface to create a thin layer, thereby reducing the distance through which the bubbles must travel to reach the upper surface of the liquid; using acoustic or ultrasonic energy to cause bubbles to vibrate, or to coalesce, or to be pushed toward coalescing zones or the surface to assist in removal of bubbles from a viscous liquid; and stirring the liquid, i.e. mechanically lifting liquid from the bottom toward the surface.

Each of the aforementioned methods to speed bubble removal has associated costs and limitations. Vacuum systems are costly to build and complex to operate. Centrifuges can be complex and are impractical when working with high temperature liquids, such as molten glass. Conventional heating of the liquid to lower the viscosity, whether using burners, electrodes, or microwaves, costs energy. The addition of new bubbles can lead to complexity, add cost for the gas, and does not assure complete capture of the smallest bubbles that are the most difficult to remove. Thin-film bubble removal by itself is impractical because a large surface area must be maintained without variations in temperature or flow rate and without excessive wear of the surface. Acoustic or ultrasonic approaches are promising, but they suffer from difficulties in scaling to a practical method that will work with the volumes of liquid commonly processed on an industrial scale. Stirring methods are used currently, but they are of limited utility and must be implemented with care to avoid the addition of new bubbles to the liquid.

The most straightforward approach to removing gaseous inclusions is to simply wait for them to rise to the surface. However, as previously indicated, this approach is particularly slow in viscous liquids because the bubbles can take a long time to rise and because small bubbles, in particular, can take an order of magnitude more time to rise. In addition, once the bubbles do reach the surface, they may stay on the surface for some time before they break.

One way to increase the rate of bubble rise and, thus, reduce refining time is to increase the temperature of the liquid containing the bubbles to decrease the liquid viscosity. For many liquids, molten glass being a prime example, a relatively small temperature increase produces a significant decrease in viscosity. Common practice is to heat the molten glass from above, thereby transferring heat down into the glass by radiation and convection. However, glass at the bottom of the molten bath also must be heated in order to fully clarify the glass, thereby necessitating overheating of all the glass above the bottom of the bath. In addition, overheating of the molten glass surface in this manner results in excessive heat loss, damage to the furnace materials, and potential volatilization of components such as boron and sodium. On the other hand, heating molten glass from above is beneficial because the bubbles reaching the surface are in a lower viscosity liquid and, as a result, are much easier to break. However, this approach to heating is inefficient because breaking bubbles on the surface of the molten glass is only useful when all of the bubbles are at the surface. If the bulk glass still contains rising bubbles, then the bubbles lower in the molten glass will need additional heat to break once they reach the surface.

As indicated above, another conventional method for decreasing refining time for molten glass is to hold the glass in a shallow bed or thin film so as to decrease the distance the bubbles are required to travel before reaching the surface to break. Typical glass melters use bed depths of 30-36 inches and forehearth (refining) channels having depths of approximately 6 inches. Using a forehearth depth for refining decreases the time required to clarify the glass by a factor of five or six. This decrease is significant but comes with the penalties of greater surface area and faster flow of glass across refractory surfaces that abrade during processing. Using depths under 4 inches for refining is impractical due to increases in surface area, heat loss, and refractory wear from the high velocities of the molten glass flowing across the surface.

The benefits of employing both the conventional method of heating molten glass and the method of holding molten glass in a relatively shallow channel are cumulative. Refining times can be decreased substantially, leading to refining times for bubbles as small as 0.1 mm in diameter in the range of about 1 to 3 hours. However, such a process would be expected to be inefficient and may also suffer from evaporative loss of some volatile components. Even with the known penalties of this approach, the practice would still suffer from a much longer refining time than desired. Production rates of glass in industrial furnaces range from about 1 to 25 tons per hour; thus, a refining chamber providing a residence time of 1 to 3 hours would be prohibitively large and costly. For a refining unit to be small enough in size to be cost-effective and practical, residence times must be reduced by another factor of 3-6 so that refining times of about 20 minutes can be achieved.

Stokes Law describes the buoyant behavior of bubbles in a viscous liquid. However, the effect of bubble surface tension is not described by Stokes Law. Depending upon the composition of the viscous liquid and the gas composition of the bubbles, bubble surface tension impacts bubble coalescence when the bubbles come in contact. Bubbles that coalesce tend to act like larger bubbles and, thus, rise more quickly. In molten glasses, the bubbles do tend to coalesce, such that when the molten glass is very bubbly and the large bubbles rise as a single mass, small bubbles cannot move around the larger bubbles and are forced to attach to the larger bubbles and rise with them. A process that provides a means for all the bubbles to rise in a single mass is, thus, much more effective at removing even the smallest of bubbles from liquid.

SUMMARY OF THE INVENTION

It is, thus, one object of this invention to provide a method for removing gaseous inclusions, or bubbles, from viscous liquids which addresses the issues set forth herein above in connection with the use of conventional means for removing such gaseous inclusions.

This and other objects of this invention are addressed by a method for removing gaseous inclusions from a viscous liquid in which a viscous liquid stream having gaseous inclusions is introduced into a refining chamber, resulting in a flowing viscous liquid layer. The viscosity of a bottom portion of the viscous liquid layer is reduced relative to an upper portion of the viscous liquid layer in a first refining zone in the refining chamber, producing an upwardly mobile reduced viscosity portion of the viscous liquid layer. Heat is then introduced into the viscous liquid layer from above the viscous liquid layer in a second refining zone in the refining chamber downstream of the first refining zone, reducing the gaseous inclusions in the viscous liquid layer. The second refining zone is located downstream of the first refining zone in a location where the gaseous inclusions have been driven to near the top surface of the viscous liquid layer, a location at which downward heating is most effective. Thereafter, the viscous liquid layer, having a reduced amount of gaseous inclusions, is discharged from the refining chamber. In accordance with one particularly preferred embodiment of this invention, the viscosity of the bottom portion of the viscous liquid layer is reduced by introducing heat into the viscous liquid layer from below the viscous liquid layer. When the heat is applied from below the viscous liquid layer, a convective flow of lower viscosity liquid is created which carries the gaseous inclusions toward the surface of the viscous liquid. Heating the viscous liquid layer from below in accordance with the method of this invention produces a less dense, i.e. lower viscosity, liquid which moves toward the liquid surface carrying the gaseous inclusions along due to the convective flow created and due to the greater buoyancy of the bubbles in the warmer, less viscous liquid. By heating the viscous liquid from below, surface volatilization is avoided because the liquid surface is not overheated. Heat applied from below spreads through the melt and hotspots that could be created at the bottom of the viscous liquid layer so as to cause some volatilization are avoided. As the heat spreads through the liquid layer, volatilized components re-condense into the liquid and, thus, are not lost due to volatilization. By heating the viscous liquid layer from below, the gaseous inclusions are driven from the bottom up toward the surface of the layer, an effect which cannot be achieved through top-down heating without overheating the entire viscous liquid layer. Finally, by heating the viscous liquid layer from below, a beneficial bubble surface tension is achieved for the promotion of bubble coalescence.

The method of this invention enables the removal of small gaseous inclusions from the entire viscous liquid which cannot be removed by conventional means of simple heating from above using a channel of reasonable depth. The speed of clarification may be reduced by a factor of 100 to 150 such that molten glass with bubbles as small as 0.1 mm may be refined in about 10-30 minutes in contrast to the 1 to 3 hours required for refining using conventional heating from above and relatively shallow channels. This improvement in refining time may be the difference between a refiner of practical size that is cost-effective and refiner that is impractical and overly costly to build.

BRIEF DESCRIPTION OF THE DRAWINGS

These and other objects and features of this invention will be better understood from the following detailed description taken in conjunction with the drawings, wherein.

DETAILED DESCRIPTION OF THE PRESENTLY PREFERRED EMBODIMENTS

Figure 1:
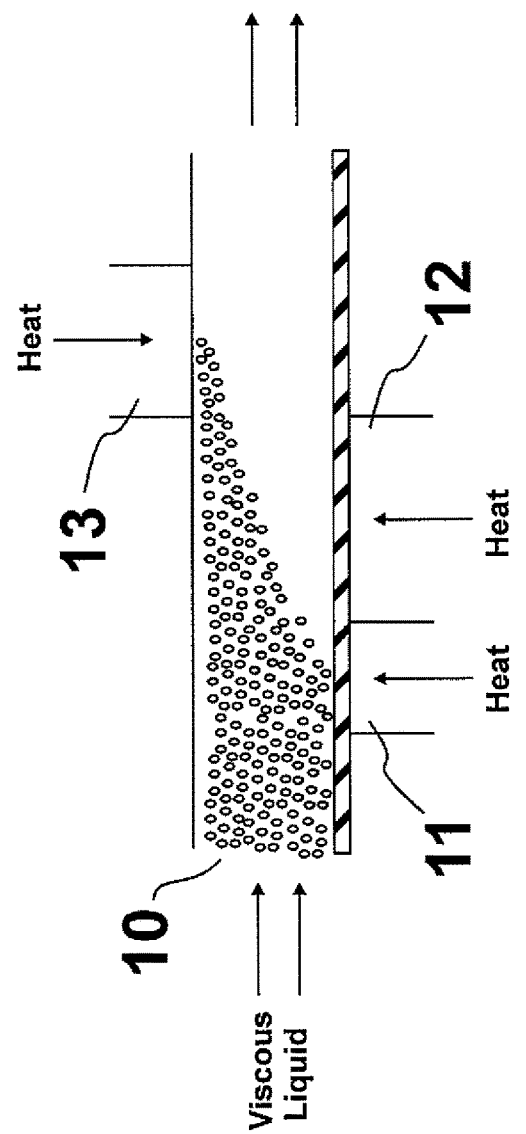
FIG. 1 is a diagram showing the impact on gaseous inclusions in a viscous liquid resulting from the application in accordance with one embodiment of the method of this invention.

A key aspect of the method of this invention is the initial heating of a bottom portion of a layer of a viscous liquid containing gaseous inclusions to reduce the viscosity thereof and initiate convective flow of the gaseous inclusions toward the surface of the viscous liquid layer. Heating from below significantly increases rising bubble velocity. Substantially greater rising bubble velocities may be achieved in accordance with one embodiment of this invention by providing the heat in a plurality of stages, preferably two stages as opposed to a single stage. This preferred embodiment is typically applied to viscous liquid streams flowing in a channel.

In the first heating stage, the viscous liquid is heated as fast as possible over a short distance, thereby initiating the upward convective flow. For molten glass, a temperature increase in the range of about 100° F. to about 300 ° F. above the average liquid temperature is preferred. Additional intense heating will overheat the viscous liquid, costing too much energy and leading to potential volatilizations at the top surface of the viscous liquid. Immediately downstream of the first heating stage is a second heating stage in which heat is applied at a lower rate than in the first heating over a longer period of time to produce a glass temperature between the highest temperature of the first stage and the average bulk viscous liquid temperature prior to introduction into the first stage. This longer period of intermediate heating maintains the upward convective flow, creates a zone of lower liquid viscosity, and helps to ensure the coalescence of the bubbles into a rising bubble mat. For molten glass, the preferred intermediate temperature is about 50° F. to about 250° F. above the average bulk liquid temperature. The length of the second heating stage is selected so that the melt surface temperature never rises more than 250° F. above the average melt temperature for more than about 10 minutes.

Bubbles that rise to the top viscous liquid surface often do not break at the surface and are carried along with the flowing liquid. To promote the breaking of the bubbles at the viscous liquid surface, in accordance with one embodiment of this invention, heat is applied to the viscous liquid from above in a third heating stage disposed downstream of the second heating stage, resulting in breaking of the bubbles as they move along on the surface of the flowing viscous liquid. Disposition of the third heating stage downstream of the second heating stage ensures that substantially all of the bubbles will have reached the viscous liquid surface or be in close proximity to the viscous liquid surface. This step prevents a "tail" of bubbles from flowing along with the flowing viscous liquid without breaking.

Heat spreads through a liquid by conduction and convection and, in accordance with the method of this invention, the heat applied in the first and second heating stages provides more intense heat to the bottom of the viscous liquid stream than the top. However, if the depth of the viscous liquid stream is too small, the viscous liquid surface will overheat. On the other hand, if the depth of the viscous liquid stream is too large, the heat applied to the bottom portion of the viscous liquid stream will dissipate too quickly and the upward convective flow will decrease and become ineffective. Accordingly, in accordance with one preferred embodiment of the method of this invention, the depth of the flowing viscous liquid stream is in the range of about 2 inches to about 12 inches. In accordance with one particularly preferred embodiment, the depth of the flowing viscous liquid stream is in the range of about 4 inches to about 8 inches. It will be appreciated that operation at depths greater than about 12 inches is possible, but will require much higher temperatures and greater heating intensities.

For viscous liquids that do not contain volatile components, in accordance with one embodiment of this invention, the first and second heating stages may be combined into a single stage of heating of the viscous liquid stream from below. In accordance with one embodiment of this invention, the amount of heat applied to the viscous liquid stream from below is decreased continuously or in a stepwise manner along the flowing viscous liquid path.

FIG. 1 illustrates the main features and primary consequences in accordance with one embodiment of the method of this invention. As shown therein, the viscous liquid containing gaseous inclusions is introduced into a channel 10 of a refining chamber having a first stage heating zone 11 in which intense heating of the viscous liquid stream from below is carried out, a second stage heating zone 12 downstream of the first heating stage zone in which moderate heating of the viscous liquid stream from below is carried out, and a third stage heating zone 13 downstream of the second stage heating zone in which direct heating of the surface of the viscous liquid stream is carried out.

Many viscous liquids, such as molten glass, are highly corrosive or will abrade a surface over which they are flowing. For this reason, minimal liquid-surface contact and velocity of these materials through the refining chamber are desirable. However, it will be appreciated that achievement of these desired objectives are necessarily tempered by the heating requirements of the viscous liquid streams in accordance with the method of this invention.

Figure 2:
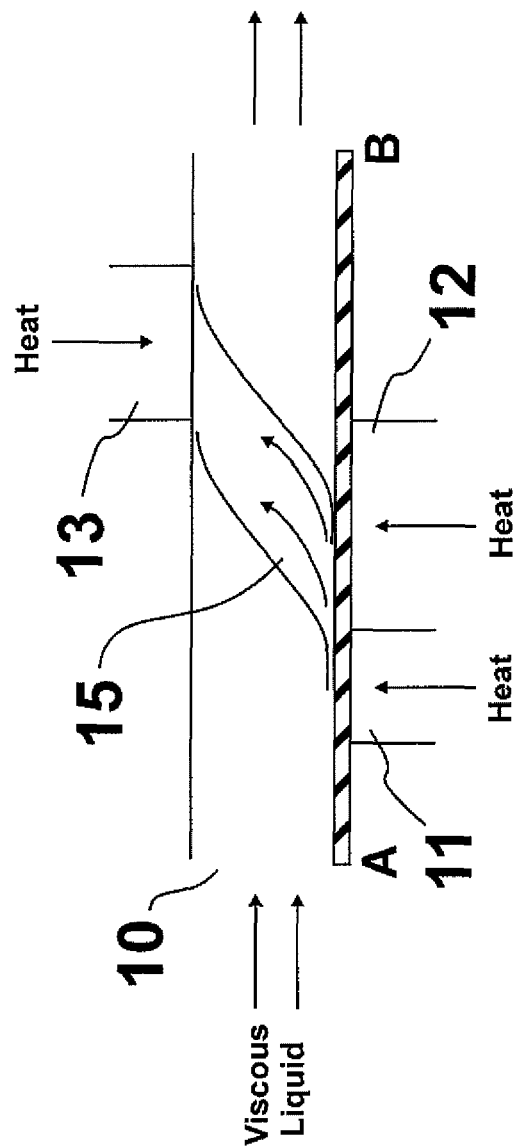
FIG. 2 is a diagram illustrating the principles of the method of this invention.

FIG. 2 illustrates the creation of a lower viscosity zone 15 within a viscous liquid stream in accordance with one embodiment of the method of this invention, in which zone bubbles (not shown) within the viscous liquid stream are carried to the surface of the viscous liquid to escape upon heating of the liquid from above. One of the benefits of the method of this invention is that the temperature of the viscous liquid is the same at point A at which the viscous liquid is introduced into the refining chamber and point B at which the viscous liquid, substantially without gaseous inclusions, exits the refining chamber. This is believed to occur because hot liquids, such as molten glass, lose heat to the refining chamber and the amount of heat supplied to the refining chamber corresponds to the amount of heat lost through the chamber walls.

Figure 3:
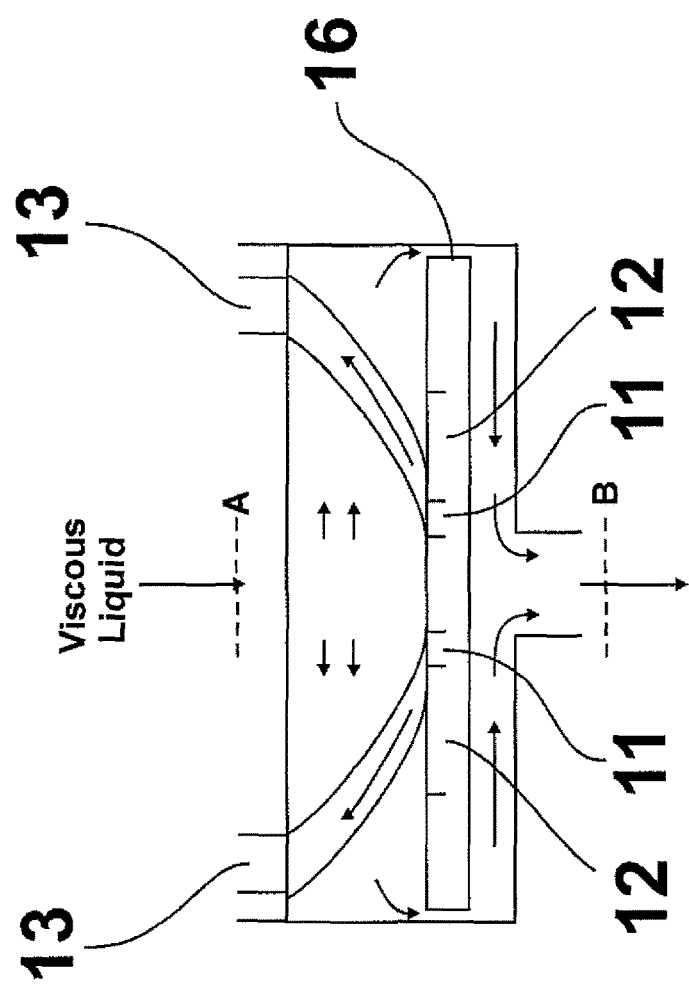
FIG. 3 is a diagram showing a refining chamber for use in accordance with one embodiment of the method of this invention.

FIG. 3 illustrates application of the method of this invention in a refining chamber in which the viscous liquid is provided to a central region of a disc or plate shaped structure 16 and the heating steps are provided such that gaseous inclusions are eliminated as the viscous liquid flows toward the edges of the structure.

Any suitable means for introducing heat into the refining chamber in accordance with the method of this invention may be employed. In accordance with one embodiment of this invention, heating may be provided through electrical heating of refractory metal or layered refractory metal surfaces on the floor of the refining chamber. Suitable refractory metals or layered metals include, but are not limited to, platinum, platinum-rhodium alloys, molybdenum, and irridium. In addition, specialized refractory materials, such as fused zirconia, alumina-zirconia-silica compositions, or non-oxide refractories, such as carbides, borides, and nitrides, that are substantially non-reactive with the viscous liquid, heated either electrically or by external heating from below may be employed. Heating from above may be carried out with burners or electric elements.

For viscous liquids having no components that will volitalize from the surface when the liquid is heated, the heating of the viscous liquid from below may be simplified to a single zone with uniform heat input in accordance with one embodiment of this invention.

Figure 4:
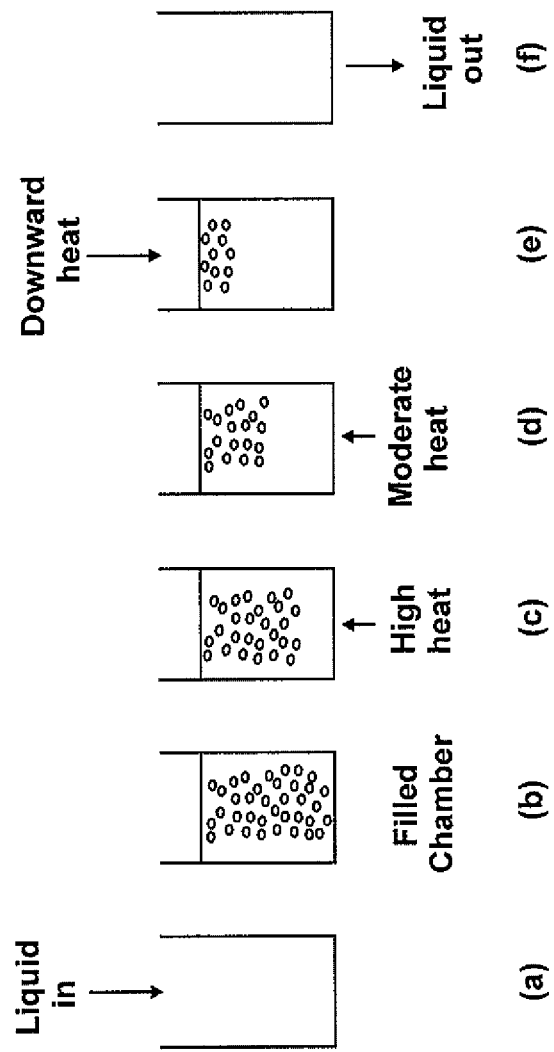
FIG. 4 is a diagram showing the disposition of gaseous inclusions in a viscous liquid during application of one embodiment of the method of this invention.

Although a continuous removal of bubbles from a flowing viscous liquid is preferred, the method in accordance with one embodiment of this invention may be applied in a batch, discontinuous configuration. In this configuration, a viscous liquid having gaseous inclusions is introduced into a chamber and held without moving. Heat is applied from below, more intense at first, then less intense, either in two stages or in a decreasing pattern. After completion of the heating from below and after the bubbles have all risen to near the surface, heating from above is applied so that the liquid surface is heated and the bubbles at and near the surface break apart quickly. The clarified viscous liquid is then discharged from the chamber as product and the chamber is recharged with bubbly viscous liquid if further liquid is to be processed. The batch refining process is illustrated in FIG. 4.

A common way to speed bubble removal from molten glass by conventional means is to inject refining agents that release large gas bubbles that will coalesce with smaller bubbles in the molten glass and carry them more quickly to the surface. One surprising benefit of the method of this invention is the elimination of the need for these expenses and environmentally undesirable refining agents. As taught by this invention, bubbles are carried upward more quickly than by normal buoyancy because upward convective flow is established, because increased temperature lowers liquid viscosity, and because bubbles coalesce into mats that collect the smallest bubbles. The method of this invention is particularly well-suited for use with bubbly glass produced by high-intensity melters, such as submerged combustion melters, that leave a large number of bubbles in the glass. The combination of a compact, low-cost submerged combustion melter with rapid refining in accordance with the method of this invention is particularly attractive as a surprisingly compatible and cost-effective means to make products such as glass of high quality at low cost. In situations in which very few bubbles are present in the viscous liquid, refining agents may be introduced into the liquid before the first stage of heating from below to enhance the coalescence of rising bubbles. Although deemed to be within the scope of the method of this invention, this embodiment is not preferred.

The method of this invention may be designed to refine the viscous liquid to virtually any quality level desired, both in number and size of product gaseous inclusions, and may be scaled to operate with any production rate within the range of conventional industrial glass factories as illustrated by the following examples. Table 1 shows common glass production rates for various types of glass.

TABLE 1

| Glass Production Rates | |
|---|---|
| Specialty glass products | 1-3 tons per hour |
| Fiberglass, tableware, sodium silicate | 3-7 tons per hour |
| Glass containers | 6-15 tons per hour |
| Flat glass | 8-25 tons per hour |

EXAMPLES

The following scenarios for implementation of the method of this invention cover the entire range of current glass furnace production. In all scenarios, the glass to be refined is produced by submerged combustion melting and contains gaseous inclusions of up to 30% by volume. The glass depth in all parts of the refining unit is 6 inches. Temperature varies based on the glass (2000° F.-2700° F.) to achieve the needed viscosity range for refining. Outside walls are constructed of 18 inches of high temperature refractory.

In this scenario, specialty glass produced at the rate of about 1 ton per hour requires a total refiner residence time of about 30 minutes in accordance with the method of this invention. In this low production case, the inside diameter of a round refining unit would be about 3.5 feet, outside diameter would be about 6.5 feet, inside height would be about 1.5 feet and outside height would be about 4.5 feet.

In this scenario, fiberglass produced at the rate of about 7 tons per hour requires a total refiner residence time of about 20 minutes in accordance with the method of this invention. In this case requiring shorter residence time to meet quality targets, the inside diameter of the a round refining unit would be about 8 feet, the outside diameter would be about 11 feet, the inside height would be about 1.5 feet, and the outside height would be about 4.5 feet.

In this scenario, container glass produced at a rate of about 15 tons per hour requires a total refining residence time of about 30 minutes in accordance with the method of this invention. In this case requiring longer residence time to meet quality targets, the inside diameter of around refining unit would be about 14 feet, the outside diameter would be about 17 feet, the inside height would be about 1.5 feet, and the outside might be about 4.5 feet.

In this scenario, flat glass for windows produced at the rate of 25 tons per hour requires a total refining time of about 40 minutes in accordance with the method of this invention. In this case requiring even longer residence time to meet quality targets, inside diameter of the refining unit would be about 21 feet, the outside diameter would be about 24 feet, inside height would be about 1.5 feet, and the outside height would be about 4.5 feet.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

We claim:
1. A method for removing gaseous inclusions from a viscous liquid comprising the steps of:
   introducing a viscous liquid stream having gaseous inclusions into a refining chamber, resulting in a flowing viscous liquid layer;

from below said viscous liquid layer introducing upstream heat from a heating means into a bottom portion of said viscous liquid layer to heat said bottom portion of said viscous liquid layer to a temperature in a range of about 100° F. to about 300° F. higher than an average bulk viscous liquid temperature in a first refining zone in said refining chamber, said refining chamber having a floor and said introducing heat into said bottom portion of said viscous liquid layer comprises heating of refractory metal or layered refractory metal surfaces on the refining chamber floor with the heating means being completely below the refining chamber floor, said heat introduction reducing a viscosity of said bottom portion of said viscous liquid layer compared with a top portion of said viscous liquid layer in said first refining zone; and producing an upwardly mobile reduced viscosity portion of said viscous liquid layer;
introducing downstream heat into said viscous liquid layer from above said viscous liquid layer in a second refining zone in said refining chamber downstream of said first refining zone, reducing said gaseous inclusions in said viscous liquid; and
discharging said viscous liquid layer from said refining chamber.

2. The method of claim 1, wherein said first refining zone comprises a plurality of heating stages.

3. The method of claim 1, wherein said viscous liquid is molten glass.

4. The method of claim 1, wherein said viscous liquid layer has a depth in a range of about 2 inches to about 12 inches.

5. The method of claim 1, wherein said viscous liquid layer is flowing at a velocity in a range of about 0.1 to about 10 inches/minute.

6. The method of claim 1, wherein said heating of said viscous liquid layer from above results in an increase in temperature of an upper portion of said viscous liquid layer up to about 75° F. above an average bulk viscous liquid temperature.

7. The method of claim 1, wherein said introducing heat into said bottom portion of said viscous liquid layer coalesces bubbles in said viscous liquid layer.

8. The method of claim 1, wherein said introducing heat into said bottom portion of said viscous liquid layer avoids creating hotspots at the bottom of said viscous liquid layer.

9. A method for removing gaseous inclusions from a viscous liquid, said method comprising:
introducing a viscous liquid having gaseous inclusions into a refining chamber to form, within the refining chamber, a viscous liquid layer containing gaseous inclusions,
heating a bottom portion of said viscous liquid layer containing gaseous inclusions by introducing a first portion of heat from a heating means into said viscous liquid layer from below said bottom portion of said liquid viscous layer to coalesce gas bubbles within said viscous liquid layer, wherein said first portion of heat to said viscous liquid is provided by heating a bottom of said refining chamber, the bottom of said refining chamber in direct contact with said viscous liquid and comprising a refractory metal or layered refractory metal surface on the refining chamber floor, with the heating means being completely below the refining chamber floor,
further heating said viscous liquid layer by introducing a second portion of heat into said viscous liquid layer from above said viscous liquid to reduce said gaseous inclusions in said viscous liquid layer; and
discharging said viscous liquid from said refining chamber.

10. The method of claim 9, wherein said viscous liquid is molten glass.

11. The method of claim 9, wherein said viscous liquid is continuously flowing through said refining chamber.

12. The method of claim 9, wherein said heating the bottom portion of said viscous liquid layer containing gaseous inclusions avoids creating hotspots at the bottom of said viscous liquid layer.

\* \* \* \* \*